US010217318B2

(12) United States Patent
Boudreau et al.

(10) Patent No.: US 10,217,318 B2
(45) Date of Patent: Feb. 26, 2019

(54) AUTOMATED TOPOLOGY GENERATION FOR ELECTRONIC GAMING MACHINES

(71) Applicant: IGT Canada Solutions ULC, Moncton (CA)

(72) Inventors: Bradley Boudreau, Dieppe (CA); Yan Meunier, Sainte Marie de Kent (CA)

(73) Assignee: IGT Canada Solutions ULC, Moncton (CA)

(*) Notice: Subject to any disclaimer, the term of this patent is extended or adjusted under 35 U.S.C. 154(b) by 125 days.

(21) Appl. No.: 14/969,039

(22) Filed: Dec. 15, 2015

(65) Prior Publication Data

US 2017/0169660 A1 Jun. 15, 2017

(51) Int. Cl.
*G06F 17/00* (2006.01)
*G07F 17/32* (2006.01)

(52) U.S. Cl.
CPC ...... *G07F 17/3227* (2013.01); *G07F 17/3211* (2013.01); *G07F 17/3225* (2013.01)

(58) Field of Classification Search
CPC ............. G07F 17/3227; G07F 17/3225; G07F 17/3211
See application file for complete search history.

(56) References Cited

U.S. PATENT DOCUMENTS

| | | | | |
|---|---|---|---|---|
| 2004/0155775 A1* | 8/2004 | Kaneko | B60R 25/102 340/539.21 |
| 2006/0071790 A1* | 4/2006 | Duron | G01S 13/75 340/572.1 |
| 2011/0291882 A1* | 12/2011 | Walsh | G01S 19/46 342/357.29 |
| 2013/0322214 A1* | 12/2013 | Neukirch | G01S 5/20 367/118 |
| 2014/0357354 A1* | 12/2014 | Gura | G07F 17/3241 463/29 |
| 2014/0365334 A1* | 12/2014 | Hurewitz | G06Q 30/0613 705/26.41 |
| 2015/0073922 A1* | 3/2015 | Epperson | G06Q 30/0277 705/14.73 |

* cited by examiner

*Primary Examiner* — Dmitry Suhol
*Assistant Examiner* — Carl V Larsen
(74) *Attorney, Agent, or Firm* — Sage Patent Group

(57) ABSTRACT

In one aspect, there is described a computer-implemented method comprising: determining locations of a plurality of electronic gaming machines through communications between the electronic gaming machines and at least one wireless transmitter provided at a known location; based on the locations of the plurality of electronic gaming machines, generating a game floor map; and displaying the game floor map on a retailer terminal, the retailer terminal configured to provide management functions for the plurality of electronic gaming machines.

20 Claims, 8 Drawing Sheets

AUTOMATED TOPOLOGY GENERATION FOR ELECTRONIC GAMING MACHINES

TECHNICAL FIELD

The present disclosure relates generally to electronic gaming systems, such as casino gaming terminals. More specifically, the present disclosure relates to methods and systems for mapping electronic gaming machines.

BACKGROUND

Electronic gaming machines ("EGMs") are often situated in a casino or other gaming establishment which houses many EGMs at a single site. For example, multiple video poker terminals may be provided in a single location.

A retailer who operates the site that houses the EGMs may be responsible for providing certain management functions for such machines. For example, the retailer may monitor machines to ensure they are operable and are functioning as expected. On sites having numerous EGMs, such management features may be onerous and tools and systems for facilitating such management functions may be helpful to the retailer.

BRIEF DESCRIPTION OF THE DRAWINGS

Reference will now be made, by way of example, to the accompanying drawings which show an embodiment of the present application, and in which.

Similar reference numerals are used in different figures to denote similar components.

DETAILED DESCRIPTION OF EXAMPLE EMBODIMENTS

In one aspect, there is described a computer-implemented method comprising: determining locations of a plurality of electronic gaming machines through communications between the electronic gaming machines and at least one wireless transmitter provided at a known location; based on the locations of the plurality of electronic gaming machines, generating a game floor map; and displaying the game floor map on a retailer terminal, the retailer terminal configured to provide management functions for the plurality of electronic gaming machines.

In another aspect, there is described a retailer terminal. The retailer terminal includes a communication subsystem for communicating with a plurality of electronic gaming machines and a display. The retailer terminal also includes a processor coupled with the communication subsystem and the display. The processor is configured to determine locations of a plurality of the electronic gaming machines based on location data received from the electronic gaming machines. The location data is obtained by the electronic gaming machines based on communications between the electronic gaming machines and at least one wireless transmitter provided at a known location. The processor is further configured to, based on the locations of the plurality of electronic gaming machines, generate a game floor map. The processor is also configured to display the game floor map on the display of the retailer terminal. The retailer terminal is configured to provide management functions for the plurality of electronic gaming machines.

In yet another aspect, there is described a non-transitory computer readable medium containing instructions which, when executed, cause a processor to: determine locations of a plurality of electronic gaming machines through communications between the electronic gaming machines and at least one wireless transmitter provided at a known location; based on the locations of the plurality of electronic gaming machines, generate a game floor map; and display the game floor map on a retailer terminal, the retailer terminal configured to provide management functions for the plurality of electronic gaming machines.

Other aspects and features of the present application will become apparent to those ordinarily skilled in the art upon review of the following description of specific embodiments of the application in conjunction with the accompanying figures.

Figure 1:
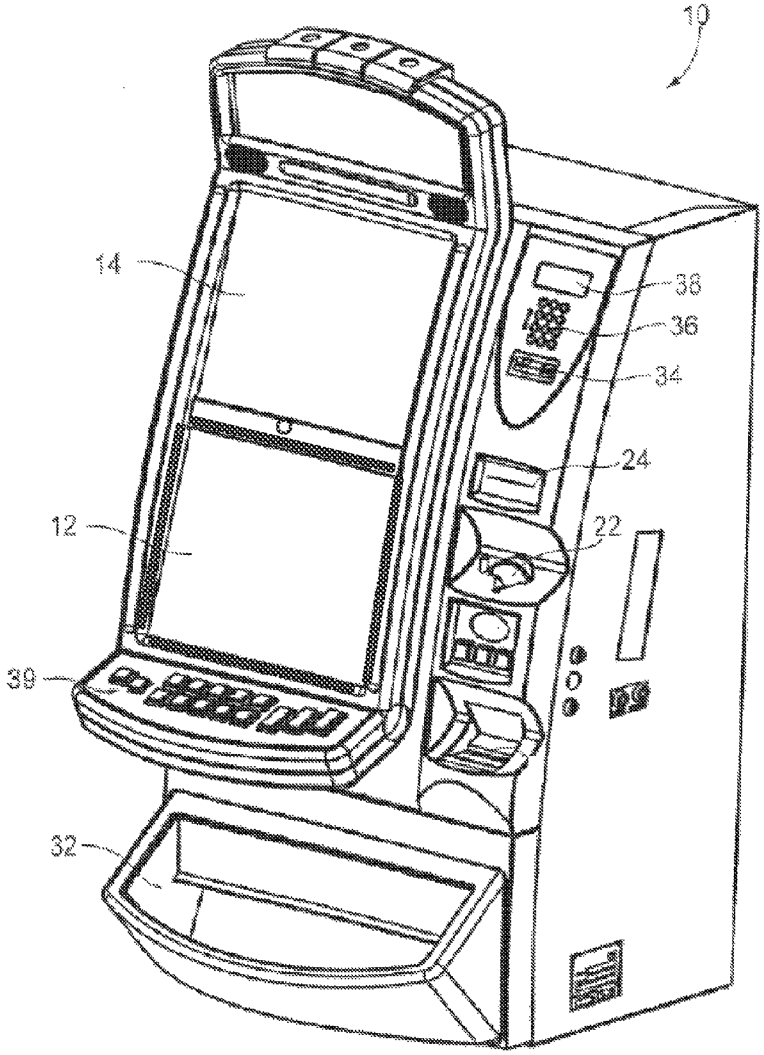
FIG. 1 shows an example electronic gaming system (EGM) in accordance with example embodiments of the present disclosure.

Reference will first be made to FIG. 1, which illustrates an example electronic gaming machine (EGM) 10 in perspective view. The EGM 10 is a wager-based system that allows a player of a game to wager on the outcome of the game. For example, the EGM 10 may be a slot machine or a video poker machine in some embodiments. Other types of EGMs may be provided in other embodiments. In some embodiments, the EGM 10 may be referred to as a video lottery terminal (VLT).

The EGM 10 includes a primary display 12 which may be of a variety of different types including, for example, a thin film transistor (TFT) display, a liquid crystal display (LCD), a cathode ray tube (CRT), a light emitting diode (LED) display, an organic light emitting diode (OLED) display, or a display of another type.

The EGM 10 of FIG. 1 also includes a second display 14. The second display provides game data or other information in addition to the display 12. The second display 14 may provide static information, such as an advertisement for the game, the rules of the game, pay tables, pay lines, or other information, or may even display the main game or a bonus game along with the display 12. The second display 14 may utilize any of the display technologies noted above (e.g., LED, OLED, CRT, etc.).

The EGM 10 is equipped with one or more input mechanisms. For example, one or both of the displays 12 and 14 may be a touchscreen which includes a touchscreen layer, such as a touchscreen overlay at a display surface 18. The touchscreen layer is touch-sensitive such that an electrical signal is produced in response to a touch. In an embodiment, the touchscreen is a capacitive touchscreen which includes a transparent grid of conductors. Touching the screen causes a change in the capacitance between conductors, which allows the location of the touch to be determined. The touchscreen may be configured for multi-touch.

Other input mechanisms may be provided instead of or in addition to the touchscreen. For example, a keypad 36 may accept player input, such as a personal identification number (PIN) or any other player information. A display 38 above keypad 36 displays a menu for instructions and other information and provides visual feedback of the keys pressed. The keypad 36 may be an input device such as a touchscreen, or dynamic digital button panel, in accordance with some embodiments.

Control buttons 39 may also act as an input mechanism and be included in the EGM. The control buttons 39 may include buttons for inputting various input commonly associated with a game provided by the EGM 10. For example, the control buttons 39 may include a bet button, a repeat bet button, a spin reels (or play) button, a maximum bet button, a cash-out button, a display pay lines button, a display payout tables button, select icon buttons, or other buttons. In some embodiments, one or more of the control buttons may be virtual buttons which are provided by a touchscreen.

The EGM 10 may also include currency, credit or token handling mechanisms for receiving currency, credits or tokens required for game play or for dispensing currency, credits or tokens based on the outcome of the game play. A coin slot 22 may accept coins or tokens in one or more denominations to generate credits within EGM 10 for playing games. An input slot 24 for an optical reader and printer receives machine readable printed tickets and outputs printed tickets for use in cashless gaming.

A coin tray 32 may receive coins or tokens from a hopper upon a win or upon the player cashing out. However, the EGM 10 may be a gaming terminal that does not pay in cash but only issues a printed ticket which is not legal tender. Rather, the printed ticket may be converted to legal tender elsewhere.

In some embodiments, a card reader interface 34, such as a card reader slot, may allow the EGM 10 to interact with a stored value card, identification card, or a card of another type. A stored value card is a card which stores a balance of credits, currency or tokens associated with that card. An identification card is a card that identifies a user. In some cases, the functions of the stored value card and identification card may be provided on a common card. However, in other embodiments, these functions may not be provided on the same card. For example, in some embodiments, an identification card may be used which allows the EGM 10 to identify an account associated with a user. The identification card uniquely identifies the user and this identifying information may be used, for example, to track the amount of play associated with the user (e.g., in order to offer the user promotions when their play reaches certain levels). The identification card may be referred to as a player tracking card. In some embodiments, an identification card may be inserted to allow the EGM 10 to access an account balance associated with the user's account. The account balance may be maintained at a host system or other remote server accessible to the EGM 10 and the EGM 10 may adjust the balance based on game play on the EGM 10. In embodiments in which a stored value card is used, a balance may be stored on the card itself and the balance may be adjusted to include additional credits when a winning outcome results from game play.

The stored value card and/or identification card may include a memory and a communication interface which allows the EGM 10 to access the memory of the stored value card. The card may take various forms including, for example, a smart card, a magnetic strip card (in which case the memory and the communication interface may both be provided by a magnetic strip), a card with a bar code printed thereon, or another type of card conveying machine readable information. In some embodiments, the card may not be in the shape of a card. Instead, the card may be provided in another form factor. For example, in some embodiments, the card may be a virtual card residing on a mobile device such as a smartphone. The mobile device may, for example, be configured to communicate with the EGM 10 via a near field communication (NFC) subsystem.

The nature of the card reader interface 34 will depend on the nature of the cards which it is intended to interact with. The card reader interface may, for example, be configured to read a magnetic code on the stored value card, interact with pins or pads associated with the card (e.g., if the card is a smart card), read a bar code or other visible indicia printed on the card (in which case the card reader interface 34 may be an optical reader), or interact with the card wirelessly (e.g., if it is NFC enabled). In some embodiments, the card is inserted into the card reader interface 34 in order to trigger the reading of the card. In other embodiments, such as in the case of NFC enabled cards, the reading of the card may be performed without requiring insertion of the card into the card reader interface 34.

The embodiments described herein are implemented by physical computer hardware. The embodiments described herein provide useful physical machines and particularly configured computer hardware arrangements of computing devices, servers, electronic gaming terminals, processors, memory, networks, for example. The embodiments described herein, for example, are directed to computer apparatuses, and methods implemented by computers through the processing of electronic data signals.

At least some computer hardware features cannot be omitted or substituted for mental means without having a material effect on the operation and structure of the embodiments described herein. The computer hardware described herein is not merely used to perform steps expeditiously and in an efficient manner.

Figure 2:
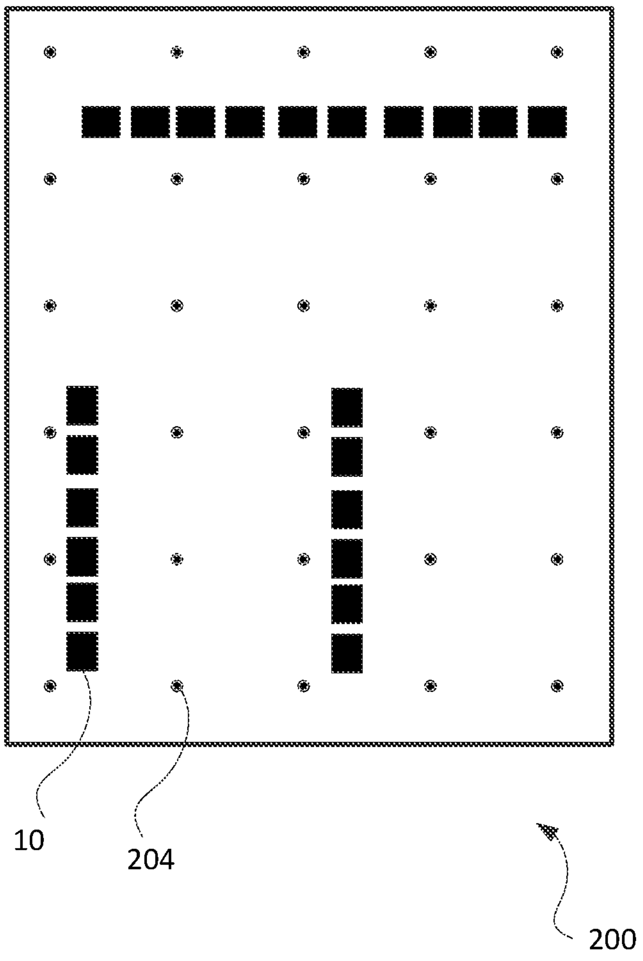
FIG. 2 shows a top view of an example installation of EGMs and wireless transmitters in accordance with an embodiment of the present disclosure.

The EGM 10 may be situated, together with other EGMs, in a building such as a casino or other gaming establishment. Referring now to FIG. 2, an example installation 200 is illustrated in overhead view. The example installation includes a plurality of EGMs and, in the example, collections of EGMs are arranged in rows. In FIG. 2, the EGMs are represented as solid rectangles. To enhance readability, only a single EGM 10 has been labelled in the figure. The example installation includes twenty two (22) EGMs, but it will be appreciated that other numbers of EGMs may be provided in other installations. In the example, six EGMs are arranged in a first row, which appears vertical in the illustration and another six EGMs are arranged in a second row, which also appears vertical in the illustration. The first row of EGMs is substantially parallel to the second row of EGMs. In the example, a third row includes ten EGMs. This third row appears horizontal in the illustration. The EGMs could have other arrangements apart from the arrangement illustrated in FIG. 2.

The installation 200 also includes a plurality of wireless transmitters 204, which are illustrated with circles. To enhance readability, only a single wireless transmitter has been identified by number in FIG. 2.

The wireless transmitters 204 are deployed on the site in the vicinity of the EGMs 10. The wireless transmitters 204 are, in the example, arranged in a grid-like pattern. The wireless transmitters may be Bluetooth beacons such as Bluetooth low energy (Bluetooth LE) transmitters. In other embodiments, the wireless transmitters may use other communication protocols. For example, the wireless transmitters may be Wi-Fi transmitters, radio frequency identification (RFID) transmitters, or transmitters of another type.

Each wireless transmitter 204 has a coverage area (not shown). The coverage area is the area around the wireless transmitter 204 in which signals sent by the wireless transmitter 204 can be received. A given wireless transmitter 204 may have a coverage area that only covers a portion of a site (i.e. it does not cover the entire building, but only a portion thereof) and the wireless transmitters may be arranged to provide coverage for the area of the building where EGMs having the auto-locating features described herein are situated. This area may be referred to as a gaming floor herein.

To allow triangulation or trilateration, the wireless transmitters 204 may be arranged such that each EGM 10 is within the coverage area of multiple wireless transmitters 204. For example, each EGM 10 having the auto-locating features described herein may be located within the coverage area of three or more wireless transmitters. The wireless transmitters 204 may be arranged so that each location on the gaming floor is within the coverage area of three or more wireless transmitters 204.

To allow the location of EGMs 10 to be determined, the wireless transmitters 204 are deployed at known locations. The location of the wireless transmitters 204 may be recorded in a database which associates identification information, such as a unique identifier of each wireless transmitter 204 with location information identifying the location of the wireless transmitter 204.

The wireless transmitters 204 transmit a wireless signal to the EGMs 10 in the applicable coverage area. More specifically, the wireless transmitters 204 may be configured with a unique identifier and the wireless signal includes the unique identifier associated with the wireless transmitter that sent the wireless signal. The wireless signal may also include a time stamp representing the time when the wireless signal was transmitted from the wireless transmitter.

Figure 3:
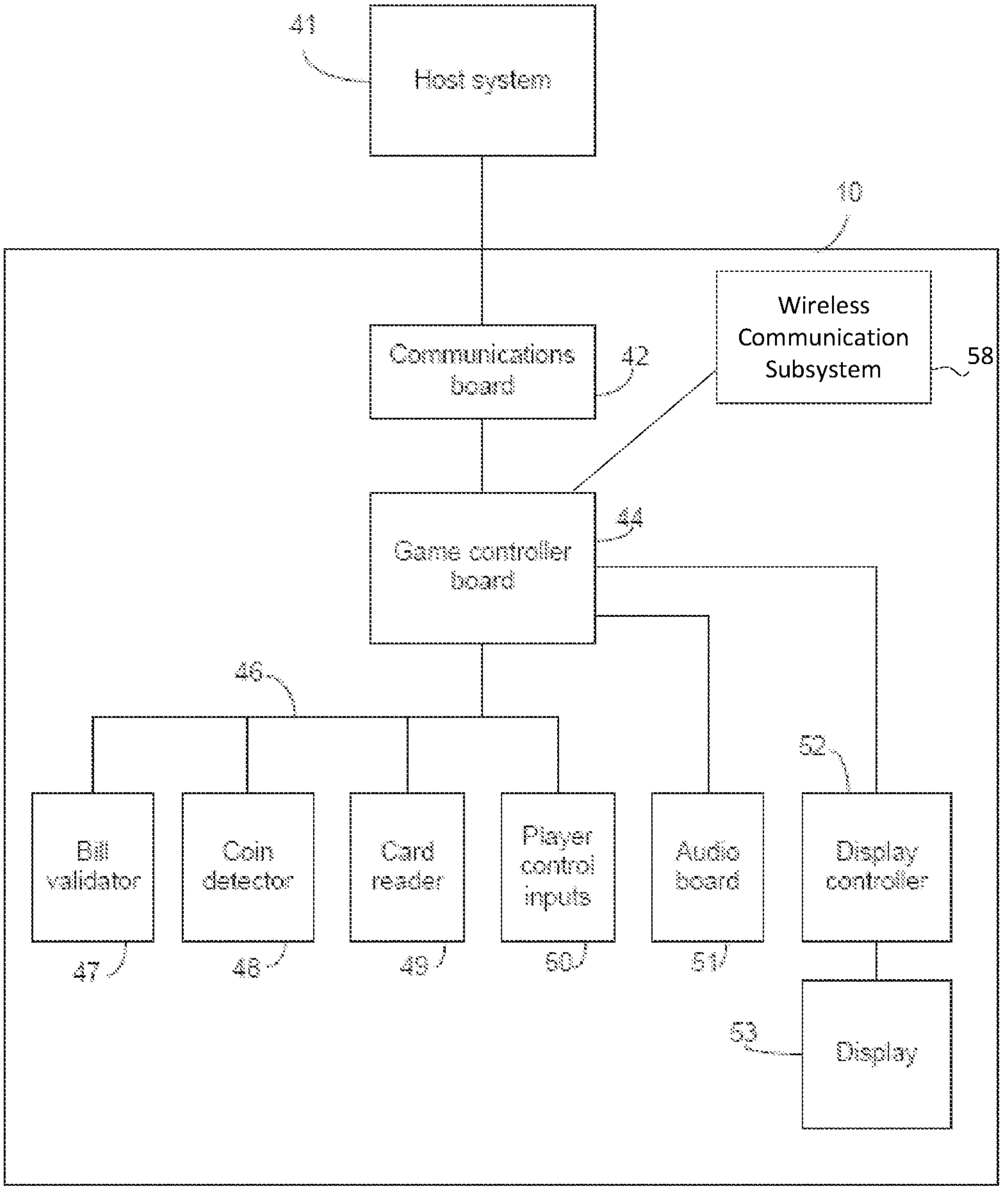
FIG. 3 illustrates a block diagram of an EGM in accordance with an embodiment of the present disclosure.

Referring now to FIG. 3, EGMs 10 with auto-locating features are equipped with a wireless communication subsystem 58 which is configured to receive the wireless signal transmitted from a wireless transmitter 204. The wireless communication subsystem 58 may be configured to send and receive communications using a Bluetooth LE, Wi-Fi, or other communication protocol. For example, the wireless communication subsystem 58 may be a Bluetooth low energy subsystem for receiving electronic signals from wireless transmitters 204 that are Bluetooth low energy transmitters.

FIG. 3 illustrates a block diagram of an EGM 10. The example EGM 10 is linked to a casino's host system 41. The host system 41 may provide the EGM 10 with instructions for carrying out game routines. The host system 41 may also manage a player account and may adjust a balance associated with the player account based on game play at the EGM 10.

The EGM 10 includes a communications board 42 which may contain conventional circuitry for coupling the EGM to a local area network (LAN) or another type of network using any suitable protocol, such as the Game to System (G2S) standard protocol. The communications board 42 may allow the EGM 10 to communicate with the host system 41 to enable software download from the host system 41, remote configuration of the EGM 10, remote software verification, and/or other features. The G2S protocol document is available from the Gaming Standards Association and this document is incorporated herein by reference.

The communications board 42 transmits and receives data using a wireless transmitter, or it may be directly connected to a network running throughout the casino floor. The communications board 42 establishes a communication link with a master controller and buffers data between the network and a game controller board 44. The communications board 42 may also communicate with a network server, such as the host system 41, for exchanging information to carry out embodiments described herein.

The communications board 42 is coupled to a game controller board 44. The game controller board 44 contains memory and a processor for carrying out programs stored in the memory and for providing the information requested by the network. The game controller board 44 primarily carries out the game routines.

Peripheral devices/boards communicate with the game controller board 44 via a bus 46 using, for example, an RS-232 interface. Such peripherals may include a bill validator 47, a coin detector 48, a card reader interface such as a smart card reader or other type of card reader 49, and player control inputs 50 (such as buttons or a touch screen).

The game controller board 44 may also control one or more devices that produce the game output including audio and video output associated with a particular game that is presented to the user. For example an audio board 51 may convert coded signals into analog signals for driving speakers. A display controller 52, which typically requires a high data transfer rate, may convert coded signals to pixel signals for the display 53. The display controller 52 and audio board 51 may be directly connected to parallel ports on the game controller board 44. The electronics on the various boards may be combined onto a single board.

The EGM 10 includes one or more processors which may be provided, for example, in the game controller board 44 and/or the display controller 52. It will be appreciated that a single "main processor", which may be provided in the game controller board, for example, may perform all of the processing functions described herein or the processing functions may be distributed. For example, the processor may analyze data obtained from the wireless communication subsystem 58, such as data provided in the wireless signal received from the wireless transmitters 204. The processor may analyze this data to determine the location of the EGM 10.

Techniques for determining the location of the EGM 10 will be explained in greater detail below with reference to operation 502 of the method 500 of FIG. 5.

Figure 4:
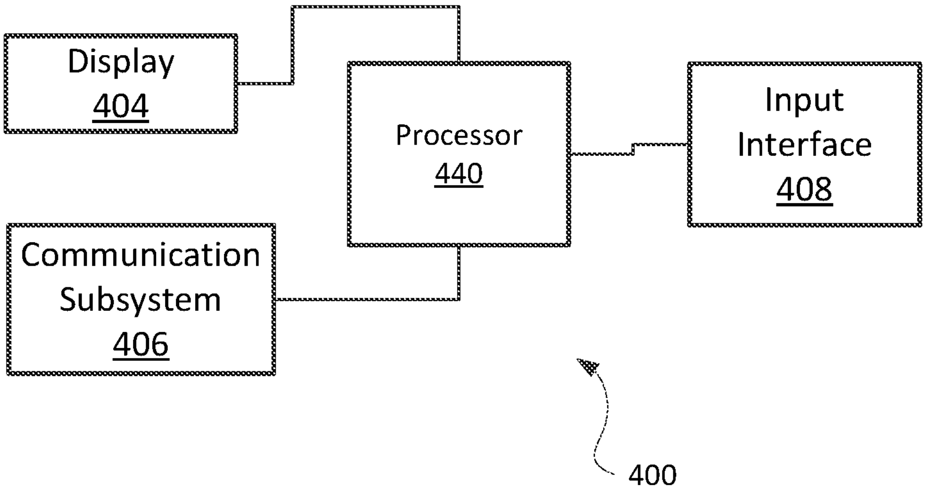
FIG. 4 illustrates a block diagram of a retailer terminal in accordance with an embodiment of the present disclosure.

Reference will now be made to FIG. 4, which illustrates a block diagram of an example retailer terminal 400. The retailer terminal 400 is a system that may be used, accessed or operated by the party that operates the installation 200 (FIG. 2) of EGMs 10. For example, the retailer terminal 400 may be a system that may be accessed by the casino or other gaming establishment that houses the EGMs and that is configured to provide management functions for a plurality of EGMs.

The retailer terminal 400 may be configured to monitor the status of the EGMs 10 in the installation 200. For example, the retailer terminal 400 may gather information about the operating status of the EGMs 10, error conditions affecting any of the EGMs, suspicious behavior at any of the EGMs, or other information. The retailer terminal 400 is operated by an operator who may, for example, be located in an accessible location such as a cash-out area to allow players of the EGMs to speak with an operator of the retailer terminal 400 if they are having difficulty with a particular one of the EGMs.

The example retailer terminal 400 includes a processor 440 which may be any type of processor, such as, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof. The processor may be coupled with memory (not shown) which stores processor-executable instructions for configuring the processor to perform a method, such as a method described herein. The retailer terminal 400 may include any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

The processor 440 is coupled with an output interface, such as a display 404. The display 404 may be, for example, a thin film transistor (TFT) display, a liquid crystal display (LCD), a cathode ray tube (CRT), a light emitting diode (LED) display, an organic light emitting diode (OLED) display, or a display of another type.

The processor 440 is coupled with an input interface 408. The input interface 408 is a device or subsystem that provides operator input to the retailer terminal 400. By way of example, the input interface 408 may be any one or a combination of: a keyboard, a mouse, a touchscreen, a pushbutton, or another type of input interface.

The retailer terminal 400 also includes a communication subsystem 406 coupled with the processor 440. The communication subsystem allows the retailer terminal to communicate with the plurality of EGMs 10. In at least some embodiments, such communication may occur via the host system 41 (FIG. 3). That is, the retailer terminal 400 may be provided on or connected to the host system 41 and the host system 41 may communicate with the EGMs and may pass along certain information about the EGMs to the retailer terminal 400. In other embodiments, the communication between the retailer terminals 400 and the EGMs may be direct and may not engage the host system.

The communication subsystem 406 may allow the EGM 10 to communicate over a LAN or another type of network using a suitable protocol, such as the G2S protocol.

Figure 5:
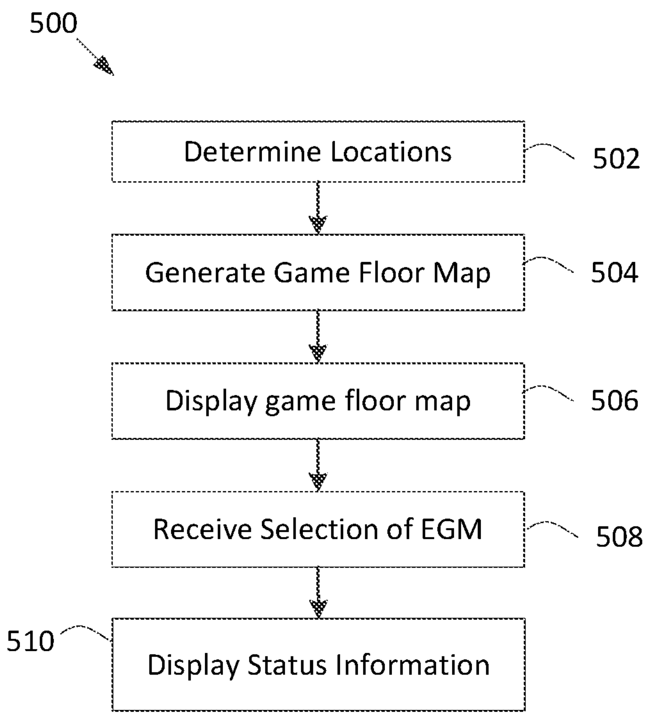
FIG. 5 illustrates a flowchart of a method of automatically generating a game floor map in accordance with example embodiments of the present disclosure.

Referring now to FIG. 5, an example method 500 for providing a game floor map will now be described. The game floor map may also be referred to as the EGM topology. The method 500 may be performed by a retailer terminal 400 such as a retailer terminal of the type described above with reference to FIG. 4. A processor 440 associated with the retailer terminal 400 may be configured to perform the method 500. More particularly, the retailer terminal 400 may include one or more processors which may be configured to perform the method 500 or parts thereof. In at least some embodiments, the processor(s) are coupled with memory containing computer-executable instructions. These computer-executable instructions are executed by the associated processor(s) and configure the processor(s) to perform the method 500.

At operation 502, the retailer terminal 400 determines the location of a plurality of EGMs 10 that are equipped with auto-locating capabilities, such as a Bluetooth low energy system that allows for communications with the wireless transmitters 204.

The location of the EGMs is automatically determined through communications between the EGMs 10 and at least one wireless transmitter 204. The wireless transmitter 204 is located at a known location. More specifically, the EGM 10, the host system 41 or the retailer terminal 400 maintains a location database in memory that maps unique identifiers of wireless transmitters 204 to a physical location in space. That is, the location database maps a unique identifier to location information representing a physical location. The physical location may be mapped using a coordinate system that has an origin that is also located in a known location. For example, the origin may be at a specific corner of the building.

Accordingly, the wireless transmitters provide their respective unique identifiers to EGMs within their respective coverage areas. The location of a particular EGM may be determined by retrieving, from the location database, location information that is associated with the unique identifier received by that EGM from one of the wireless transmitters.

Location information associated with a plurality of unique identifiers associated with a plurality of wireless transmitters that are in communication with a particular EGM may be used to determine the location of the EGM 10. For example, the location may be determined by performing triangulation or trilateration using the known locations of the wireless transmitters 204 that communicated with an EGM 10.

In some embodiments, timing information may be used to determine the location of an EGM 10. A wireless transmitter 204 may include a time stamp in the wireless signals sent to EGMs. From this time stamp, timing information is determined representing the amount of time elapsed from the transmission of the electronic signals by the wireless transmitter and the recent of that electronic signal by an EGM 10. The timing information may be used to facilitate locating the EGM. That is, the timing information can be used to determine the relative distance between a wireless transmitter and the EGM.

In some embodiments, received signal strength may also be used to assist with determining the location of an EGM 10. The signal strength of signals received from wireless transmitters may also be assessed to identify the relative distance of a wireless transmitter from an EGM.

Operation 502 may be performed by the retailer terminal 400 with assistance from the EGM 10 and, in at least some embodiments, the host system 41. For example, the EGM 10 is configured to gather data from a plurality of wireless transmitters 204. In some embodiments, this data may be provided to the host system 41 which may access the location database defining the locations of the wireless transmitters. The host system 41 may then determine the location of the EGM and may provide this information to the retailer terminal 400.

At operation 504, the retailer terminal (or the host system 41) generates a game floor map based on the locations determined at operation 502. The game floor map represents the relative locations of the EGMs. The game floor map may define the location of each EGM relative to a coordinate system. The coordinate system may have an arbitrary origin or it may have an origin that corresponds to a feature of the installation that houses the EGMs, or that corresponds to a location of a particular one of the EGMs; for example, the first EGM installed in the installation.

The game floor map may, in some embodiments, be provided on a floor plan. The floor plan may include features of the installation that are located at fixed positions in space, such as walls. The floor plan may, therefore, map building features. The floor plan may be uploaded to the retailer terminal 400 (or the host system 41) by an operator of such systems and may have some location information associated therewith in memory that allows the location of the wireless transmitters to be determined relative to other features represented on the floor plan.

Accordingly, in at least some embodiments, at operation 504 the retailer terminal may generate a game floor map that includes both the floor plan and the EGMs. That is, the game floor map illustrates the location of each of the EGMs on the floor plan that identifies building features.

Figure 6:
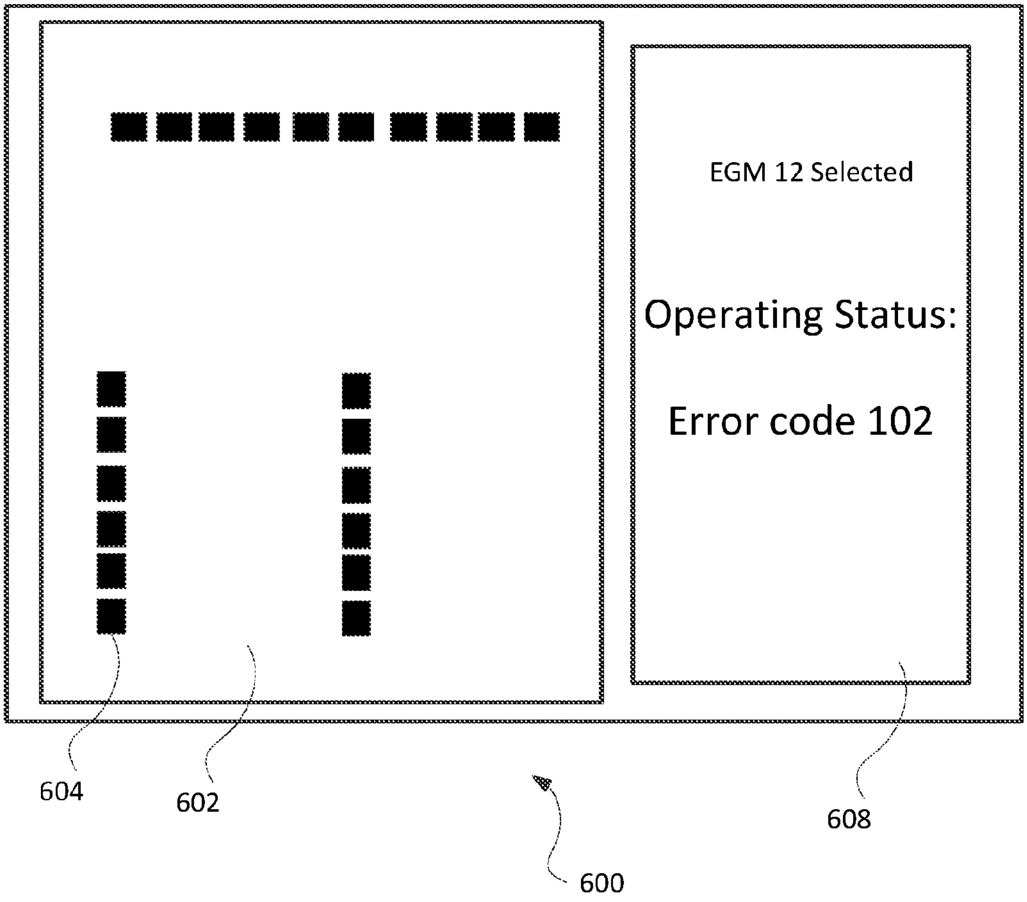
FIG. 6 illustrates an example game floor map and status screen in accordance with an embodiment of the present disclosure.

At operation 506, the game floor map is displayed on the retailer terminal. Referring briefly to FIG. 6, an example game floor map 602 is displayed on a status screen 600 of the retailer terminal 400. The status screen provides information about the operating status of the EGMs.

The example game floor map 602 includes a plurality of EGM representations 604. The example includes twenty two (22) EGM representations 604 representing the EGMs 10 of the installation of FIG. 2. For readability only a single EGM representation 604 is illustrated by number. Each EGM representation 604 illustrates one of the EGMs 10 in the installation 200 and each EGM is displayed at a location that represents its location in the installation 200.

The example status screen 600 is used to display system status information about EGMs. For example, the EGM representations 604 may be selectable. Referring again to FIG. 5, at operation 508, a selection of one of the EGMs may be received through the status screen 600 and, in response, at operation 510, system information about the selected EGM is displayed in a system status area 608 (FIG. 6) of the status screen 600. The system information may, for example, specify whether the EGM is: operating normally, experiencing an error, powered off, frozen, etc.

Figure 7:
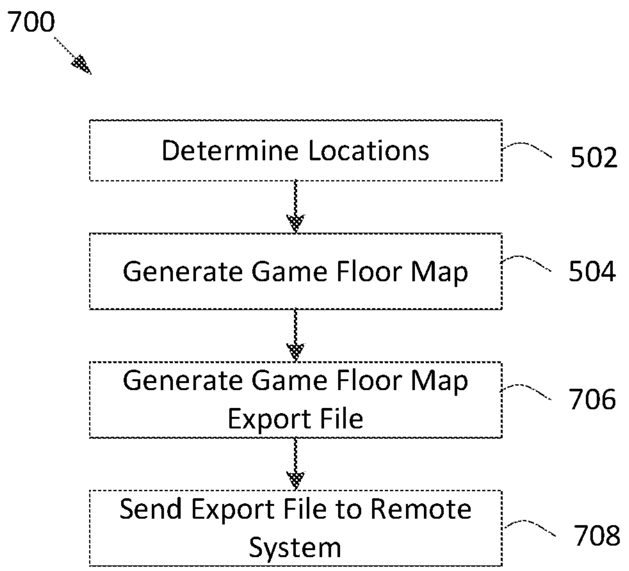
FIG. 7 is a flowchart of a method of exporting a game floor map in accordance with an embodiment of the present disclosure.

Reference will now be made to FIG. 7 which illustrates a flowchart of an example method 700 for exporting a game floor map. The method may be performed by a retailer terminal 400 such as a retailer terminal of the type described above with reference to FIG. 4 or by a host system 41 as described above with reference to FIG. 3. A processor 440 associated with the retailer terminal 400 or host system 41 may be configured to perform the method 700. More particularly, the retailer terminal 400 or host system may include one or more processors which may be configured to perform the method 700 or parts thereof. In at least some embodiments, the processor(s) are coupled with memory containing computer-executable instructions. These computer-executable instructions are executed by the associated processor(s) and configure the processor(s) to perform the method 700.

The method 700 of FIG. 7 may include some features in common with the method 500 of FIG. 5 and the discussion of such features will not be repeated at length. For example, at operation 502, the location of the EGMs may be determined through communications between the EGMs and at least one wireless transmitter provided at a known location. Similarly, at operation 504, a game floor map is generated based on the locations of the plurality of EGMs.

At operation 706, a processor generates a game floor map export file. The game floor map export file provides information about the relative locations of the EGMs. At operation 708, the game floor map export file is sent to a remote system. The game floor map export file can be accessed by the remote system in order to view the locations of the EGMs.

Figure 8:
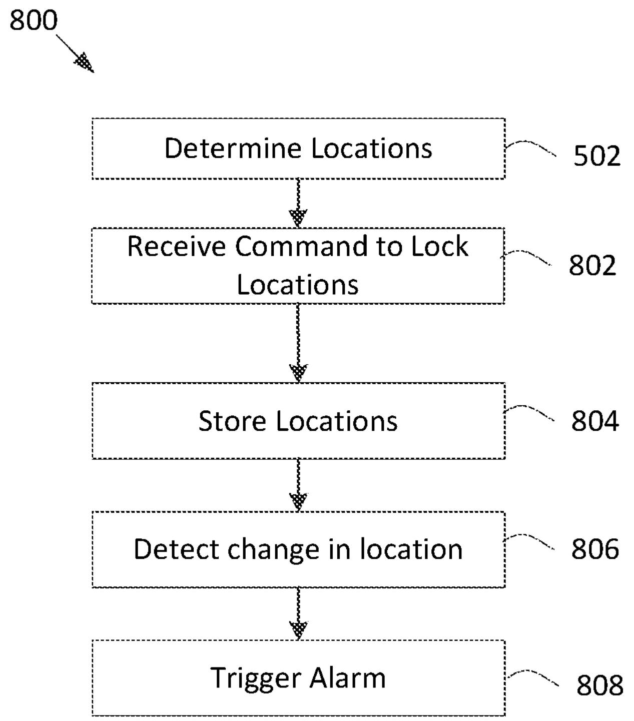
FIG. 8 is a flowchart of a method of triggering an alarm responsive to movement of an EGM in accordance with an embodiment of the present disclosure.

Reference will now be made to FIG. 8 which illustrates a flowchart of an example method 800 for automatically triggering an alarm based on movement of an EGM. The method may be performed by a retailer terminal 400 such as a retailer terminal of the type described above with reference to FIG. 4 or by a host system 41 as described above with reference to FIG. 3. A processor 440 associated with the retailer terminal 400 or host system 41 may be configured to perform the method 800. More particularly, the retailer terminal 400 or host system may include one or more processors which may be configured to perform the method 800 or parts thereof. In at least some embodiments, the processor(s) are coupled with memory containing computer-executable instructions. These computer-executable instructions are executed by the associated processor(s) and configure the processor(s) to perform the method 800.

The method 800 of FIG. 8 may include some features in common with the method 500 of FIG. 5 and the discussion of such features will not be repeated at length. For example, at operation 502, the location of the EGMs may be determined through communications between the EGMs and at least one wireless transmitter provided at a known location. At operation 802, a command may be received through an input interface associated with the retailer terminal to lock the locations of the EGMs. In response to receiving such a command, at operation 804, the locations of the EGMs may be stored in memory.

After the locations have been stored, at operation 806, a change in location of one of the EGMs 10 is detected which causes an alarm to be triggered at operation 808. The alarm may be triggered at an output interface and may, for example, be audible, vibratory, or visual.

To prevent unnecessary alarms, the retailer terminal or host system 41 may store a threshold which is used, at operation 806, to determine whether the location of the EGM 10 has, in fact changed. Minor changes in location (i.e., changes that are less than the threshold) may be attributed to noise associated with the location determination techniques and may be ignored.

The embodiments described above described the use of a grid of wireless transmitters 204 deployed on a site in the vicinity of EGMs 10 (See FIG. 2 in particular). These wireless transmitters 204 emitted a signal that was received at EGMs in coverage. More particularly, the signal was received at the wireless communication subsystem of the EGM, which operated as a receiver. In other embodiments, the EGM 10 could include a wireless transmitter 204 such as a wireless transmitter of the type described above with reference to FIG. 2. The installation 200 (FIG. 2) could include wireless receivers in the place of the wireless transmitters 204 illustrated in FIG. 2. That is, the wireless receivers could be deployed on the site in a grid-like pattern. Each wireless transmitter is located at a known location and that known location could be used to determine the location of the EGMs. For example, the wireless transmitters 204 on the EGMs could emit a signal that is received at the wireless receivers distributed throughout the site. Since the location of the wireless receivers is known, the system could determine the location of the EGMs 10 in a manners similar to that described above with reference to operation 502 of the methods 500 and 700 of FIGS. 5 and 7. However, instead of using the known location of the wireless transmitters 204, the known location of the wireless receivers could be used to identify the location of the EGMs.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the enhancements to game components may be embodied as a tangible, non-transitory computer readable storage medium (or multiple computer readable storage media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer-readable storage media) encoded with one or more programs that, when executed on one or more computers or other processors, perform methods that implement the various embodiments discussed above. The computer readable medium or media can be transportable, such that the program or programs stored thereon can be loaded onto one or more different computers or other processors to implement various aspects as discussed above. As used herein, the term "non-transitory computer-readable storage medium" encompasses only a computer-readable medium that can be considered to be a manufacture (i.e., article of manufacture) or a machine.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods as described herein need not reside on a single computer or processor, but may be distributed in a modular fashion amongst a number of different computers or processors to implement various aspects.

In the present disclosure, the term "a processor" is intended to include both a single processor and also a plurality of processors coupled to one another which distribute operations among the processors.

Computer-executable instructions may be in many forms, such as program modules, executed by one or more computers or other devices. Generally, program modules include routines, programs, objects, components, data structures, etc, that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present game enhancements may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. While particular embodiments have been shown and described, it will be obvious to those skilled in the art that changes and modifications may be made without departing from this invention in its broader aspects. The appended claims are to encompass within their scope all such changes and modifications.

What is claimed is:

1. A computer-implemented method comprising:
- determining locations of a plurality of electronic gaming machines through communications between the electronic gaming machines and a wireless transmitter comprising a unique identifier provided at a known location, wherein determining a location of one of the plurality of electronic gaming machines comprises:
  - receiving a wireless electronic signal from the wireless transmitter, the wireless electronic signal comprising the unique identifier and a time stamp;
  - retrieving, from memory, location information associated with the unique identifier;
  - determining timing information from the time stamp; and
  - based on the timing information and the location information, determining a relative distance between that one of the plurality of electronic gaming machines and the wireless transmitter;
- storing the locations of the plurality of electronic gaming machines in memory;
- determining that a location of one of the plurality of electronic gaming machines has changed;
- in response to determining that the location of one of the plurality of electronic gaming machines has changed, triggering an alarm;
- based on the locations of the plurality of electronic gaming machines, generating a game floor map; and
- displaying the game floor map on a retailer terminal, the retailer terminal configured to provide management functions for the plurality of electronic gaming machines.

2. The method of claim 1, wherein determining the location of one of the electronic gaming machines comprises determining the location of the one of the electronic gaming machines by retrieving, from memory, location information associated with a plurality of unique identifiers associated with a plurality of wireless transmitters that includes the wireless transmitter in communication with that one of the electronic gaming machines and determining the location based on the retrieved location information and the determined relative distance between that one of the plurality of electronic gaming machines and the wireless transmitter.

3. The method of claim 2, wherein determining the location of the one of the plurality of electronic gaming machines comprises performing triangulation or trilateration.

4. The method of claim 1, wherein the wireless transmitter is a Bluetooth low energy transmitter and wherein the electronic gaming machines include Bluetooth low energy subsystems for receiving electronic signals from the Bluetooth low energy transmitter.

5. The method of claim 1, wherein the game floor map is displayed on a status screen of the retailer terminal, the status screen providing information about an operating status of one or more of the plurality of electronic gaming machines.

6. The method of claim 5, further comprising:

receiving, through the status screen, a selection of one of the electronic gaming machines;

and, in response to receiving the selection, displaying status information about the selected electronic gaming machine.

7. The method of claim 1, further comprising:

generating a game floor map export file; and sending the game floor map export file to a remote system.

8. The method of claim 1, wherein triggering the alarm further comprises displaying the alarm on the retailer terminal.

9. The method of claim 1, further comprising:

receiving a command through an input interface associated with the retailer terminal to lock the locations of the electronic gaming machines; and in response to receiving the command to lock the locations, storing the locations of the plurality of electronic gaming machines in memory.

10. A retailer terminal comprising:

a communication subsystem for communicating with a plurality of electronic gaming machines;

a display; and a processor coupled with the communication subsystem and the display, the processor configured to:

determine locations of a plurality of the electronic gaming machines based on location data received from the electronic gaming machines, the location data obtained by the electronic gaming machines based on communications between the electronic gaming machines and a wireless transmitter comprising a unique identifier provided at a known location, wherein the processor is further configured to determine a location of one of the plurality of electronic gaming machines comprises by being further configured to:

receive a wireless electronic signal from the wireless transmitter, the wireless electronic signal comprising the unique identifier and a time stamp;

retrieve, from memory, location information associated with the unique identifier;

determine timing information from the time stamp; and based on the timing information and the location information, determine a relative distance between that one of the electronic gaming machines and the wireless transmitter;

store the locations of the plurality of electronic gaming machines in memory;

determine that a location of one of the plurality of electronic gaming machines has changed;

in response to determining that the location of one of the plurality of electronic gaming machines has changed, trigger an alarm;

based on the locations of the plurality of electronic gaming machines, generate a game floor map; and display the game floor map on the display of the retailer terminal, the retailer terminal configured to provide management functions for the plurality of electronic gaming machines.

11. The retailer terminal of claim 10, wherein the processor is further configured to determine the location of one of the electronic gaming machines by being further configured to determine the location of the one of the plurality of electronic gaming machines by retrieving, from memory, location information associated with a plurality of unique identifiers associated with a plurality of wireless transmitters that includes the wireless transmitter in communication with that one of the plurality of electronic gaming machines and determining the location based on the retrieved location information and the determined relative distance between that one of the electronic gaming machines and the wireless transmitter.

12. The retailer terminal of claim 10, wherein the processor is further configured to determine the location of the one of the electronic gaming machines by being further configured to perform triangulation or trilateration.

13. The retailer terminal of claim 10, wherein the wireless transmitter is a Bluetooth low energy transmitter and wherein the electronic gaming machines include Bluetooth low energy subsystems for receiving electronic signals from the Bluetooth low energy transmitter.

14. The retailer terminal of claim 10, wherein the game floor map is displayed on a status screen of the retailer terminal, the status screen providing information about an operating status of one or more of the plurality of electronic gaming machines.

15. The retailer terminal of claim 14, wherein the processor is further configured to:

receive, through the status screen, a selection of one of the electronic gaming machines; and, in response to receiving the selection, display status information about the selected electronic gaming machine.

16. The retailer terminal of claim 10, wherein the processor is further configured to:

generate a game floor map export file; and send the game floor map export file to a remote system.

17. The retailer terminal of claim 10, wherein the processor is further configured to:

trigger the alarm by displaying the alarm on the retailer terminal.

18. The retailer terminal of claim 10, wherein the processor is further configured to:

receive a command through an input interface associated with the retailer terminal to lock the locations of the plurality of electronic gaming machines; and in response to receiving the command to lock the locations, store the locations of the plurality of electronic gaming machines in memory.

19. A non-transitory computer-readable storage medium comprising computer-executable instructions which, when executed by a processor, configure the processor to:

determine locations of a plurality of electronic gaming machines based on location data received from the electronic gaming machines, the location data obtained by the electronic gaming machines based on communications between the electronic gaming machines and a wireless radio frequency transmitter or wireless radio frequency receiver provided at a known location and comprising a unique identifier, wherein the instructions that configure the processor to determine the locations of the one of the plurality of electronic gaming machines further configure the processor to perform triangulation or trilateration based on determining timing information and location information for each of the plurality of electronic gaming machines;

store the locations of the plurality of electronic gaming machines in memory;

determine that a location of one of the plurality of electronic gaming machines has changed;

in response to determining that the location of one of the plurality of electronic gaming machines has changed, trigger an alarm;

based on the locations of the plurality of electronic gaming machines, generate a game floor map; and display the game floor map on a display of a retailer terminal configured to provide management functions for the plurality of electronic gaming machines.

20. The computer-readable storage medium of claim 19, instructions that configure the processor to trigger the alarm further configure the processor to trigger the alarm by displaying the alarm on the retailer terminal.

* * * * *